(12) United States Patent
Gateau

(10) Patent No.: US 9,691,391 B2
(45) Date of Patent: Jun. 27, 2017

(54) CLUSTERING OF AUDIO FILES USING GRAPHS

(71) Applicant: KnuEdge Incorporated, San Diego, CA (US)

(72) Inventor: Rodney Gateau, Los Angeles, CA (US)

(73) Assignee: KnuEdge Incorporated, San Diego, CA (US)

( * ) Notice: Subject to any disclaimer, the term of this patent is extended or adjusted under 35 U.S.C. 154(b) by 128 days.

(21) Appl. No.: 14/718,823

(22) Filed: May 21, 2015

(65) Prior Publication Data

US 2016/0234616 A1 Aug. 11, 2016

Related U.S. Application Data

(60) Provisional application No. 62/114,119, filed on Feb. 10, 2015.

(51) Int. Cl.
*G10L 17/00* (2013.01)
*H04R 3/00* (2006.01)
*G10L 17/06* (2013.01)

(52) U.S. Cl.
CPC .............. *G10L 17/00* (2013.01); *G10L 17/06* (2013.01); *H04R 3/00* (2013.01)

(58) Field of Classification Search
None
See application file for complete search history.

(56) References Cited

U.S. PATENT DOCUMENTS

| 2013/0006634 A1* | 1/2013 | Grokop | G10L 17/10 704/245 |
| 2014/0074471 A1* | 3/2014 | Sankar | G10L 17/02 704/246 |
| 2015/0120290 A1* | 4/2015 | Shagalov | G10L 15/083 704/231 |

* cited by examiner

*Primary Examiner* — Paul Huber
(74) *Attorney, Agent, or Firm* — Fish & Richardson P.C.

(57) ABSTRACT

Systems and methods to perform speaker clustering determine which audio segments appear to include sound generated by the same speaker. Speaker clustering is based on creating a graph in which a node represents an audio segment and an edge between two nodes represents a relationship and/or correspondence that reflects a probability, likelihood, or other indication that the two nodes represent audio segments of the same speaker. This graph is analyzed to detect individual communities of nodes that associate to an individual speaker.

20 Claims, 4 Drawing Sheets

300

CLUSTERING OF AUDIO FILES USING GRAPHS

CROSS-REFERENCE TO RELATED APPLICATIONS

This application claims priority to U.S. Provisional Application No. 62/114,119, filed Feb. 10, 2015, the contents of which is incorporated herein by reference in its entirety.

FIELD

The invention relates to speaker clustering, and, in particular, to systems that determine which audio segments appear to include sound generated by the same speaker.

BACKGROUND

Speaker identification and/or verification systems commonly use recorded audio files that include sound generated by one or more people (also referred to herein as speakers). Based on one or more audio files, one or more audio characteristics and/or parameters may be assessed per speaker. A set of audio characteristics, together with any other information that may be useful to characterize and/or identify a particular speaker, may form the basis of a model of the particular speaker (for example, a parameterized model representing a particular speaker). Speaker models may be used to assess, estimate, determine, and/or otherwise reach a decision on whether two or more audio files correspond to the same speaker or different speakers.

SUMMARY

One aspect according to the disclosure relates to a system for speaker clustering. Speaker clustering may involve analyzing two or more audio segments to determine, assess, and/or otherwise reach a decision as to which of such audio segments form a set of audio segments comprising sounds (such as voice) generated by the same speaker.

A system according to the present disclosure may include one or more physical processors (interchangeably referred to herein as "processors"), physical storage media (interchangeably referred to herein as "electronic storage"), and/or other components. The physical storage media may be configured to store information. Physical storage media may refer to RAM, SRAM, DRAM, eDRAM, SDRAM, volatile memory, non-volatile memory, and/or other types of electronic memory, in particular non-transitive electronic storage, or any other suitable form of storage media known in the art.

The system may be configured to process and/or exchange information, including but not limited to processing and/or exchanging information by executing one or more program components. In certain embodiments according to the present disclosure, one or more of these program components may be implemented in dedicated hardware, reprogrammable hardware, computer software, or any appropriate combination thereof. The program components may include one or more of an input component, a parameter component, a relationship component, a representation component, a community component, a speaker component, and/or other components.

An input component may be configured to obtain one or more audio segments. As used herein, the term "obtain" (and derivatives thereof) may include active and/or passive retrieval, determination, derivation, transfer, and/or exchange of information, and/or any combination thereof. Individual audio segments may include representations of sound generated by one or more speakers. In some embodiments, such representations may include recordings of speakers, conversations, meetings, and/or other gatherings where one or more people might speak. In some embodiments according to the present disclosure, individual audio segments may include a representation of sound generated solely by an individual speaker. As used herein, an audio segment that includes a representation of sound generated by a speaker may be referred to as an "audio segment of the speaker," an "audio segment representing the speaker," or an "audio segment including the speaker," interchangeably. As used herein, the term "segment" may refer to an electronic audio stream, an electronic file or document, and/or any part, fragment, and/or section thereof.

A parameter component may be configured to determine one or more audio characteristics for one or more audio segments. As used herein, the term "determine" (and derivatives thereof) may include measure, calculate, compute, estimate, approximate, generate, and/or otherwise derive, and/or any combination thereof. One or more audio characteristics, together with any other information that may be useful to characterize and/or identify a particular speaker, may form the basis of a model of the particular speaker (for example, a parameterized model representing a particular speaker), or a "speaker model." In some embodiments according to the present disclosure, a speaker model may include one or more model parameters that are indicative of one or more audio characteristics of generated sound in one or more recorded audio files. A speaker model including one or more parameters may be referred to as a "parameterized speaker model." In some embodiments, the parameter component may be configured to determine one or more values of parameters included in a speaker model and/or one or more values representative of one or more audio characteristics for one or more audio segments.

A relationship component may be configured to determine one or more scores that may represent a correspondence between two or more audio segments, e.g. pairs of audio segments. Such one or more scores may be computed dependent on the method of speaker modeling used, and may include similarity metrics (such as cosine similarity), joint factor analysis, probabilistic linear discriminant analysis (PLDA), and/or any other suitable metrics that may be used to determine whether different audio segments represent the same speaker. In some embodiments, the relationship component may be configured to determine, among pairs of audio segments, one or more scores that represent a correspondence between an individual pair of audio segments. The relationship component may be configured to identify relationships between pairs of audio segments based on the one or more scores.

The one or more scores determined by the relationship component may be based on the audio characteristics determined by the parameter component. In some embodiments, the one or more scores may indicate a likelihood, possibility, and/or statistical variable that reflect, regarding and between two audio segments, whether they represent the same speaker. For example, individual ones of the one or more scores may be expressed as a percentage, wherein 0% indicates it is very unlikely that two particular audio segments represent the same speaker, and 100% indicates it is very likely that two particular audio segments represent the same speaker. In some embodiments, relationships may be identified by comparing one or more scores with one or more thresholds. For example, in some embodiments a threshold value may be set at 75%, such that if a score is 75% it may then be assumed that two particular audio segments represent the same speaker. In other embodiments, the threshold value may be set at 85% or 95%; it will be understood by one having ordinary skill in the art that the threshold may be set at any value suitable to the application.

The representation component may be configured to generate, create, determine, derive, and/or otherwise construct a graph and/or other representation including a set of nodes and a set of edges between nodes. In some embodiments according to the present disclosure, individual nodes in the graph and/or representation may represent one or more audio segments (e.g. an individual audio segment). In some embodiments, individual edges may connect two nodes. In some embodiments, individual edges between pairs of nodes may represent a relationship between both nodes in a pair, e.g. as identified by the relationship component.

For example, an individual edge between two particular nodes may represent a relationship between the two particular nodes. For example, the relationship may represent at least a threshold level of one or more scores as described elsewhere herein, and, in particular, the one or more values determined by the relationship component. In some embodiments, the representation component may be configured to limit edges to only those pairs of nodes representing audio segments that have a relationship that meets particular criteria (e.g. an identified relationship). For example, the relationship component may only create an edge between two nodes if the relationship between those nodes achieves the threshold value described above; thus, in such an embodiment, it could be assumed that if two nodes are linked by an edge, they have an identified relationship.

A community component may be configured to analyze a graph and/or representation (in particular generated, created, determined, derived, and/or otherwise constructed by the representation component) to detect one or more groups, set, and/or communities of nodes within the graph. In some embodiments, this process of group detection by the community component may be performed such that individual nodes are assigned to exactly one group, set, and/or community within the graph. In some embodiments, operation by the community component may be based on community detection techniques that may be used to detect communities in networks of users, including but not limited to users in a communications network, a social network, and/or other networks having multiple users. In some embodiments, detection by the community component may be based on which nodes are connected by edges. In some embodiments, detection by the community component may not be based on the particular values of any scores as described elsewhere herein, but rather may simply be based on the existence and/or occurrence of an edge between pairs of nodes.

A speaker component may be configured to associate nodes in one or more groups, sets, and/or communities to indicate that an individual community is related to or associated with an individual speaker. For example, the nodes in an individual group, set, and/or community may represent one or more audio segments. The speaker component may be configured to associate these one or more audio segments as including representations of sounds generated by the same speaker, e.g. a common speaker. In other words, the nodes in a particular group, set, and/or community may represent audio segments of the same speaker. In some embodiments, nodes outside of the particular group, set, and/or community may represent audio segments of one or more different speakers. In some embodiments, no nodes outside of the particular group, set, and/or community represent an audio segment of the same speaker as the nodes in the particular group, set, and/or community.

As used herein, any association (and/or relation and/or correspondency) involving audio segments, representations, speakers, audio characteristics, relationships, scores, metrics, values, nodes, edges, sets, groups, communities, users, and/or another entity or object that interacts with any part of the system, may be a one-to-one association, a one-to-many association, a many-to-one association, and/or a many-to-many association or N-to-M association (note that N and M may be different numbers greater than 1).

These and other objects, features, and characteristics of the described embodiments, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Figure 1:
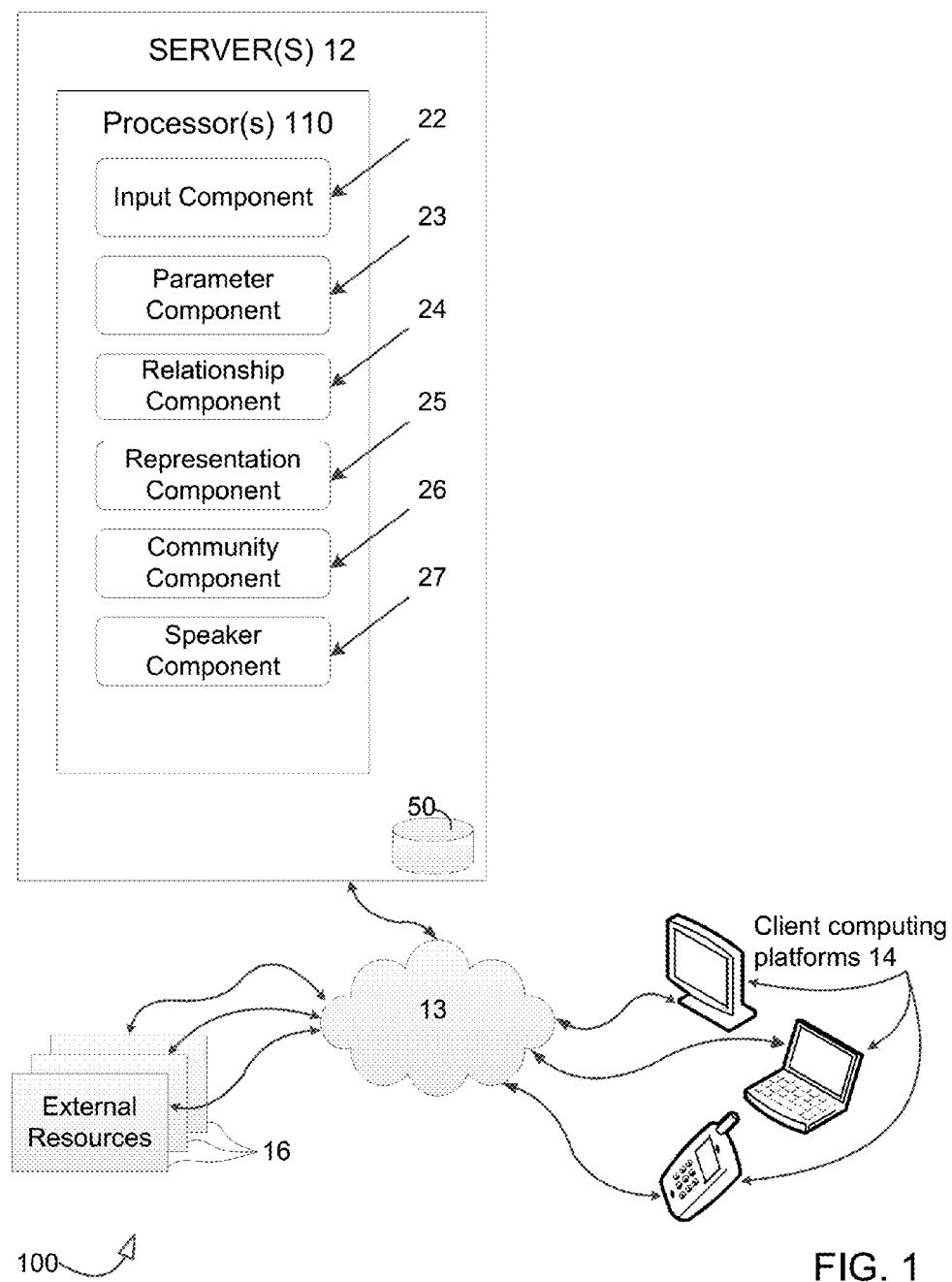
FIG. 1 illustrates a system for speaker clustering in accordance with one or more embodiments.

This description is not intended to be a detailed catalog of all the different ways in which the disclosure may be implemented, or all the features that may be added to the instant disclosure. For example, features illustrated with respect to one embodiment may be incorporated into other embodiments, and features illustrated with respect to a particular embodiment may be deleted from that embodiment. Thus, the disclosure contemplates that in some embodiments of the disclosure, any feature or combination of features set forth herein can be excluded or omitted. In addition, numerous variations and additions to the various embodiments suggested herein will be apparent to those skilled in the art in light of the instant disclosure, which do not depart from the instant disclosure. In other instances, well known structures, interfaces, and processes have not been shown in detail in order not to unnecessarily obscure the invention. It is intended that no part of this specification be construed to effect a disavowal of any part of the full scope of the invention. Hence, the following descriptions are intended to illustrate some particular embodiments of the disclosure, and not to exhaustively specify all permutations, combinations and variations thereof.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

Unless otherwise defined, all technical and scientific terms used herein have the same meaning as commonly understood by one of ordinary skill in the art to which this disclosure belongs. The terminology used in the description of the disclosure herein is for the purpose of describing particular embodiments only and is not intended to be limiting of the disclosure.

All publications, patent applications, patents and other references cited herein are incorporated by reference in their entireties for the teachings relevant to the sentence and/or paragraph in which the reference is presented. References to techniques employed herein are intended to refer to the techniques as commonly understood in the art, including variations on those techniques or substitutions of equivalent techniques that would be apparent to one of skill in the art.

As used in the description of the disclosure and the appended claims, the singular forms "a," "an" and "the" are intended to include the plural forms as well, unless the context clearly indicates otherwise.

As used herein, "and/or" refers to and encompasses any and all possible combinations of one or more of the associated listed items, as well as the lack of combinations when interpreted in the alternative ("or").

FIG. 1 illustrates an exemplary system 100 according to the present disclosure for speaker clustering. System 100 may include one or more servers 12, one or more processors 110, one or more electronic storages 50, one or more program components, and/or one or more other components.

In some embodiments, server 12 may include electronic storage 50, one or more processors 110, and/or other components. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12. Server 12 further may include one or more communication lines or ports to enable the exchange of information with a network 13 and/or other computing platforms.

In certain embodiments according to the present disclosure, one or more of these program components may be implemented in dedicated hardware, reprogrammable hardware, computer software, or any appropriate combination thereof. The program components may include one or more of an input component 22, a parameter component 23, a relationship component 24, a representation component 25, a community component 26, a speaker component 27, and/or other components. In embodiments wherein the program components are implemented in computer software, server 12 and/or processor 110 may be configured to execute one or more of such computer program components.

The program components may be configured to enable a user of system 100 to interface with system 100 and/or external resources 16; for example, a user of system 100 may interface with system 100 and/or external resources 16 through the client computing platforms 14.

By way of non-limiting example, client computing platforms 14 may include one or more of a desktop computer, a laptop computer, a handheld computer, a tablet computing platform, a NetBook, a telephone, a Smartphone, a gaming console, a mobile computing platform, a television, a device for streaming internet media, and/or other computing platforms.

External resources 16 may include sources of information, audio segments and/or files, speaker models, audio characteristics (e.g. related to audio segments), hosts and/or providers of computing environments and/or virtual environments outside of system 100, external entities participating with system 100, and/or other resources. In some embodiments, some or all of the functionality attributed herein to external resources 16 may be provided by resources included in system 100.

Server(s) 12 may include electronic storage 50. In some embodiments, functionality attributed herein to processor 110 of server 12 or to a computer program component of server 12 may be not limited to server 12, but rather may be provided by resources of client computing platform(s) 14, and/or jointly provided by both server 12 and one or more client computing platforms 14. The depiction in FIG. 1 is not intended to be limiting in any way with regard to the location of any particular functionality described herein. The terms "client computing platform" and "client" may be used interchangeably herein.

Server 12, client computing platforms 14, and/or external resources 16 may be operatively linked via one or more electronic communication links. For example, such electronic communication links may be established, at least in part, via network 13 such as the Internet and/or other (communication) networks. It will be appreciated that this is not intended to be limiting, and that the scope of this disclosure includes embodiments in which servers 12, client computing platforms 14, and/or external resources 16 may be operatively linked via some other communication media.

System 100 may be configured to verify, validate, confirm, assess, determine, estimate, and/or otherwise reach a decision on whether certain audio segments appear to (and/or are deemed to) include representations of sound generated by a particular speaker, and/or a common speaker. In some embodiments, system 100 may be configured to operate based on one or more speaker models of one or more speakers.

As used and/or referred to in this disclosure, assume that one or more speakers have generated sound (e.g. utterances, sentences, statements, and/or other sounds that can be produced by humans) which has been recorded into one or more audio files and/or segments thereof (i.e. audio segments). Assume that audio characteristics of this generated sound may be determined, measured, estimated, extracted and/or otherwise obtained, either through functionality included in system 100 (including, but not limited to parameter component 23) or externally, and/or any combination thereof.

Input component 22 may be configured to obtain one or more audio segments. Individual audio segments may include representations of sound generated by one or more speakers. In some embodiments, such representations may include recordings of speakers, conversations, meetings, and/or other gatherings where one or more people might speak. In some embodiments, individual audio segments may include a representation of sound generated by an individual speaker. In some embodiments, one or more audio segments may include a representation of sound wherein the identity of an individual speaker is known. In some embodiments, one or more audio segments may be obtained from one or more sources external to system 100. These audio segments may be pre-recorded, or may be captured in real-time. They may comprise any suitable audio format, though it will be understood by one having ordinary skill in the art that the quality of the audio segment and/or any distortions in the audio segment may adversely affect performance.

Parameter component 23 may be configured to determine one or more audio characteristics for one or more audio segments, such as the mel-frequency cepstral coefficients, pitch, timbre, or longer term prosodic features of such audio segments. In certain embodiments, it may be desirable to include with the determined audio characteristics certain additional information that may be useful to characterize and/or identify a particular speaker (e.g., gender, age, emotional state, words spoken) and/or the recording conditions (e.g., microphone/handset, indoor/outdoor, room size, noise levels), to create a speaker model of the particular speaker (for example, a parameterized model representing a particular speaker). In some embodiments, speaker models may include one or more model parameters that are indicative of one or more audio characteristics of generated sound in one or more recorded audio files. A speaker model including one or more parameters may be referred to as a "parameterized speaker model." Exemplary forms of suitable speaker models include, but are not limited to, supervector and i-vector modeling.

In some embodiments, parameter component 23 may be configured to determine one or more values of parameters included in a speaker model and/or one or more values representative of one or more audio characteristics for one or more audio segments. In some embodiments, one or more audio characteristics may represent speaker-specific characteristics. In certain embodiments, and as described in greater detail below, the parameter component 23 may produce a fixed-length data vector, such as a supervector or an i-vector, wherein the length of the vector is independent of the amount of input audio data.

Individual speaker models may represent an individual speaker, one or more factors related to the identity of an individual speaker, sound generated by an individual speaker, and/or represent and/or include audio characteristics of an individual speaker, audio characteristics of sound generated by an individual speaker in one or more recorded audio files and/or segments, and/or combination or derivatives thereof. In some embodiments, a speaker model may be used to determine if two audio segments correspond to the same speaker or different speakers. In some embodiments, it may be desirable for individual speaker models to exclude external factors to the extent possible. In practice, some external factors, such as, for example, the type of recording equipment used to generate the audio files or audio segments on which a particular speaker model is based, may have an effect on the particular speaker model.

In some embodiments, one or more speaker models may be constructed and/or modified based on (or representing or indicative of) one or more audio characteristics. In some embodiments, speaker models may include one or more model parameters that are indicative or representative of one or more audio characteristics of generated sound in one or more recorded audio files and/or audio segments. A speaker model including one or more parameters may be referred to as a "parameterized speaker model." In some embodiments, speaker models may include vectors of one or more values. For example, a speaker model may include a fixed-length vector of a predetermined and/or fixed number of values. As used herein, "fixed-length" refers to the notion that the number of values in a vector may be independent from the number or length of the corresponding recorded audio files and/or audio segments. By way of example, and not limitation, fixed-length vectors may range from tens to thousands of values (which may be referred to as "dimensions" of the vector).

Construction of a speaker model may be accomplished through any suitable means, including but not limited to functionality included in system 100 (including, but not limited to parameter component 23) or externally, and/or any combination thereof. In some embodiments, construction of speaker models may be based on a set of training data, e.g. recorded audio files of sound generated by a known set of speakers.

Relationship component 24 may be configured to determine one or more scores that represent correspondence between audio segments, e.g. pairs of audio segments. The one or more scores may be computed using similarity metrics (such as cosine similarity), joint factor analysis, and/or other metrics that may be used to determine whether different audio segments represent the same speaker. In some embodiments, relationship component 24 may be configured to determine, among pairs of audio segments, one or more scores that represent a correspondence between a pair of audio segments. The one or more scores may be determined using the speaker model or the audio characteristics determined by parameter component 23 for each of the pair of audio segments. In some embodiments, the one or more scores may indicate a likelihood, possibility, and/or statistical variable that reflect, regarding and between two audio segments, how likely it is that both segments represent the same speaker. For example, individual ones of the one or more scores may be expressed as a percentage, wherein 0% indicates it would be very unlikely that two particular audio segments represent the same speaker, and 100% indicates it would be very likely that two particular audio segments represent the same speaker.

Relationship component 24 may be configured to identify relationships between pairs of audio segments (e.g., that the audio segments likely correspond to the same speaker) based on the one or more scores. In some embodiments, relationships may be identified by comparing one or more scores with one or more thresholds.

In some embodiments, a score may be computed for pairs of audio segments and a predetermined threshold may be used to determine whether a relationship exists between each pair of audio segments. For example, when the score corresponding to a pair of audio segments exceeds the threshold, the relationship may exist and when the score does not exceed the threshold, the relationship may not exist.

In some embodiments, the threshold may be determined using the scores obtained for the pairs of audio segments. For each pair of audio segments, the pair may correspond to the same speaker (i.e., matching) or the pair may correspond to different speakers (i.e., non-matching). For each of these two possibilities, the scores may have a different probability distribution. For example, the probability distribution of scores for matching audio segments may have a higher mean, and the probability distribution of scores for non-matching audio segments may have a lower mean. By determining a probability distribution of the scores (for both matching and non-matching audio segments) a threshold may be determined that helps to separate matching from non-matching audio segments.

In some embodiments, a probability distribution of the scores may be computed using a mixture model. For example, the scores for matching audio segments may be modeled as a first Gaussian probability density function and the scores for non-matching audio segments may be modeled as a second Gaussian probability distribution. For each pair of audio segments, it is not known if the pair is matching or non-matching, and the parameters of the mixture model may be determined using techniques such as the expectation-maximization algorithm. Where a mixture model of two Gaussian distributions are used, the parameters of the mixture model may include a mean, variance (or standard deviation), and amplitude for each Gaussian.

A threshold may be determined from the parameters of the mixture model. In some embodiments, a threshold may be chosen that is between the two means of the mixture model, such as the average of the two means. In some embodiments, probabilities, such as likelihood ratios or log-likelihood ratios may be used to determine an appropriate threshold.

In some embodiments, the threshold may be selected according to desired error rates. Two types of errors may occur: (i) that a pair of audio segments are determined to have a relationship (e.g., correspond to the same speaker) when they in fact do not have the relationship (false match), or (ii) that two audio segments are determined to not have a relationship when they in fact do have the relationship (false non-match). A threshold may be chosen to favor one at the expense of the other. For example, choosing a high threshold may cause a low false match error rate and a high false non-match error rate, and choosing a low threshold may cause a low false non-match error rate and a high false match error rate. A threshold may accordingly be selected to obtain a desired match error rate or a desired non-match error rate.

In selecting a threshold, a prior or a Bayesian prior may be used. For example, selecting a threshold may depend on the number of speakers corresponding to the audio segments. If it is known that the 100 audio segments have only 2 different speakers, then a lower threshold may be preferred, but if the 100 audio segments have 50 different speakers, then a higher threshold may be preferred (or vice versa). In determining the probability of a match error or a non-match error, the prior may be used to obtain a more accurate threshold.

In some embodiments, individual audio segments may be represented by a fixed-length vector. In some embodiments, a score that represents a correspondence between a pair of audio segments may be based on a measure of the difference of the vectors of each audio segment. For example, the difference between two fixed-length vectors may be based on the (multi-dimensional) distance between the two fixed-length vectors.

In some embodiments, values determined by relationship component 24 may be calibrated, e.g. to compensate for influence and/or bias in the determination of audio characteristics. By way of non-limiting example, bias and/or influence may be introduced through one or more external factors, one or more speaker-specific factors, meta-data, and/or other factors. External factors may include one or more of ambient noise (sound of rain, fan, engine, etc.), background noise, audio quality, the type of communication, telephony, and/or recording equipment used for record audio, and/or any combination thereof. Speaker-specific characteristics may include one or more of gender, native language, speech impediment, emotional state, medical condition, and/or other speaker-specific characteristics. It will be understood by one having ordinary skill in the art that these factors could impact the performance of the relationship component 24.

For example, such external factors may change the statistics of the scores as compared to scores produced with respect to training data. If the audio is noisy, pairwise comparisons could produce scores that are systematically lower than the scores produced with training data. Using the threshold defined with the training data would result in false negatives; i.e., many same-speaker speaker pairs could be erroneously rejected because the scores fall below the predetermined threshold. In certain embodiments, however, this may be addressed by determining a threshold based on a large set of recordings. By virtue of calibration, one or more factors may be counter-acted, reduced, or removed.

Alternatively, and/or simultaneously, calibration may enable a user of system 100 to systematically act on an error preference (e.g. how bad or severe, in relative terms, a false positive determination or false negative determination is considered to be). For example, if it is important to the user to optimize the recognition of same-speaker trials, system 100 could be calibrated to recognize same-speaker trials at the cost of more errors with respect to different-speaker trials. In some embodiments, values determined by relationship component 24 may be converted to probabilities to enable straightforward calibration and implementation of a user-defined error preference.

Representation component 25 may be configured to generate, create, determine, derive, and/or otherwise construct a graph and/or other representation including a set of nodes and a set of edges between nodes that may, but need not, be visually presented to a user on a client computing platform 14 or an external source 16. In some embodiments, individual nodes in the graph and/or representation may represent one or more audio segments (e.g. an individual audio segment). In some embodiments, individual edges connect between two nodes. In some embodiments, individual edges between pairs of nodes may represent a relationship between both nodes in a pair, e.g. as identified by relationship component 24. For example, an individual edge between two particular nodes may represent a particular relationship between the two particular nodes. For example, the relationship may represent at least a threshold level of one or more scores as described elsewhere herein, and, in particular, the one or more scores determined by relationship component 24.

In some embodiments, representation component 25 may be configured to limit edges to only those pairs of nodes representing audio segments that have a relationship (e.g. a relationship as identified by relationship component 24) that meets particular criteria. For example, the relationship component 25 may only create an edge between two nodes if the relationship between those nodes achieves the threshold value described above; thus, in such an embodiment, it could be determined that if two nodes are linked by an edge, they have an identified relationship (such as corresponding to the same speaker).

Figure 3:
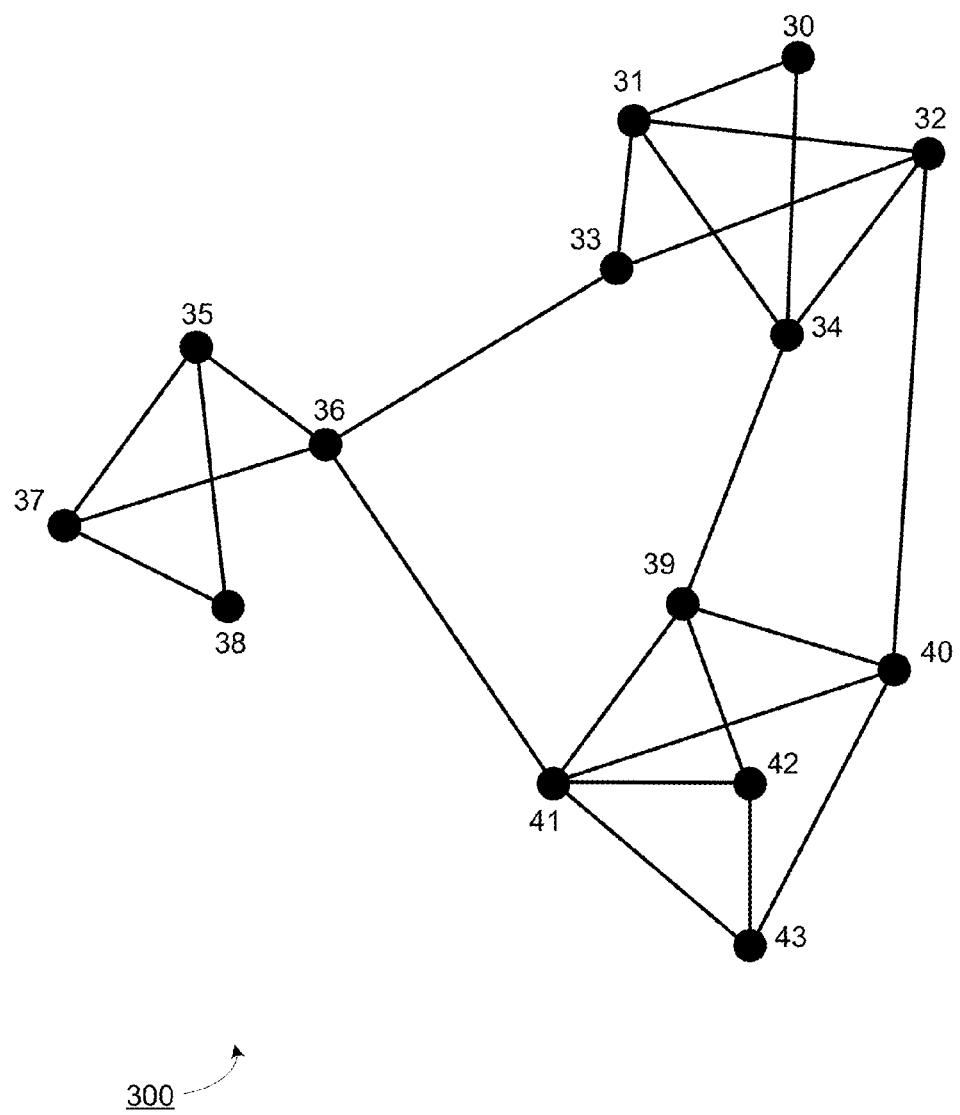
FIGS. 3-4 illustrate exemplary graphs in which the nodes represent audio segments in accordance with one or more embodiments.

By way of non-limiting example, FIG. 3 illustrates a graph 300 as may be generated by a representation component as described herein. Graph 300 includes 14 nodes, labeled from node 30 to node 43. Each node in graph 300 may represent an audio segment that includes one or more representations of sound generated by a speaker. Audio characteristics and/or speaker models may be determined for one or more of the audio segments represented by nodes 30-43. Among pairs of the audio segments that are represented by nodes 30-43, scores may be determined that represent correspondences between the pairs of audio segments. Each edge in graph 300 may represent an identified relationship between a pair of audio segments, for example, for which the scores meet or exceed a threshold value. For example, the relationship between node 30 and 31 may have a sufficient correspondence (and/or similarity) as indicated by the edge between these nodes. Node 30 and node 32 may have an insufficient correspondence (and/or similarity) as indicated by the lack of an edge between node 30 and node 32. Note that a particular node may have multiple edges with different other nodes, such as is shown for node 31. Note that setting a low threshold value may result in a graph in which all or most nodes are connected with edges to all or most other nodes (which would be the correct graph if all audio segments represent the same speaker). Note that setting a high threshold value may result in a graph in which none or few nodes are connected with edges to any other nodes (which would be the correct graph if all audio segments represent different speakers). A threshold value may be selected as described in greater detail above.

Community component 26 may be configured to analyze a graph and/or representation (such as one generated, created, determined, derived, and/or otherwise constructed by representation component 25) to detect one or more groups, sets, and/or communities of nodes. In some embodiments, detection by community component 26 may be performed such that individual nodes belong to exactly one group, set, and/or community. In some embodiments, operation by community component 26 may be based on community detection techniques that may be used to detect communities in networks of users, including but limited to users in a communications network, a social network, and/or other networks having multiple users. For example, in some embodiments, a community detection algorithm used for the operation of community component 26 may be a modularity-based algorithm, including, but not limited to the algorithms described in the article/paper "Fast unfolding of communities in large networks" by Vincent D. Blondel et al., the contents of which are incorporated herein by reference in its entirety. However, it will be understood by one having ordinary skill in the art that numerous other techniques are known for detecting communities within networks (including but not limited to clique-based methods, the Girvan-Newman algorithm, hierarchical clustering and statistical inference), and such other (types of) algorithms are envisioned as within the scope of this disclosure.

In some embodiments, detection by community component 26 may be based on which nodes are connected by edges. In some embodiments, detection by community component 26 may not be based on the particular scores as described elsewhere herein, other than being based on the existence and/or occurrence of an edge between pairs of nodes. In other words, detection by community component 26 may operate on an unweighted graph. For example, community component 26 may be configured to determine and/or detect for which (possibly non-overlapping) communities of nodes the nodes within each community are internally densely connected, while the nodes between different communities are sparsely connected.

In some embodiments, community component 26 may initialize the process of determining communities of nodes by assigning each node to its own community. An iterative process may then be used to move a node into or out of a community. At each stage of the iterative process, a community metric may be used to assess the quality state of the communities in the graph. For example, a community metric may be a graph modularity metric, or a metric that counts a number of edges within communities and also counts edges that cross a community boundary. At each stage of the iterative process, it may be proposed to move an individual node from a first community to a second community. Whether to move the node from the first community to the second community may be determined by computing the community metric for the node in the first community, computing the community metric for the node in the second community, and then choosing the option that has the higher score. During the iterative process, nodes may be considered sequentially. For example, each node may be considered in a specified order, or at each stage of the iterative process a node may be selected randomly. In some embodiments, nodes in or near to a community may be processed in sequence before proceeding to process nodes in or near another community. This iterative process may proceed until a termination criterion has been met, such as a number of nodes processed or convergence of a community metric.

Figure 4:
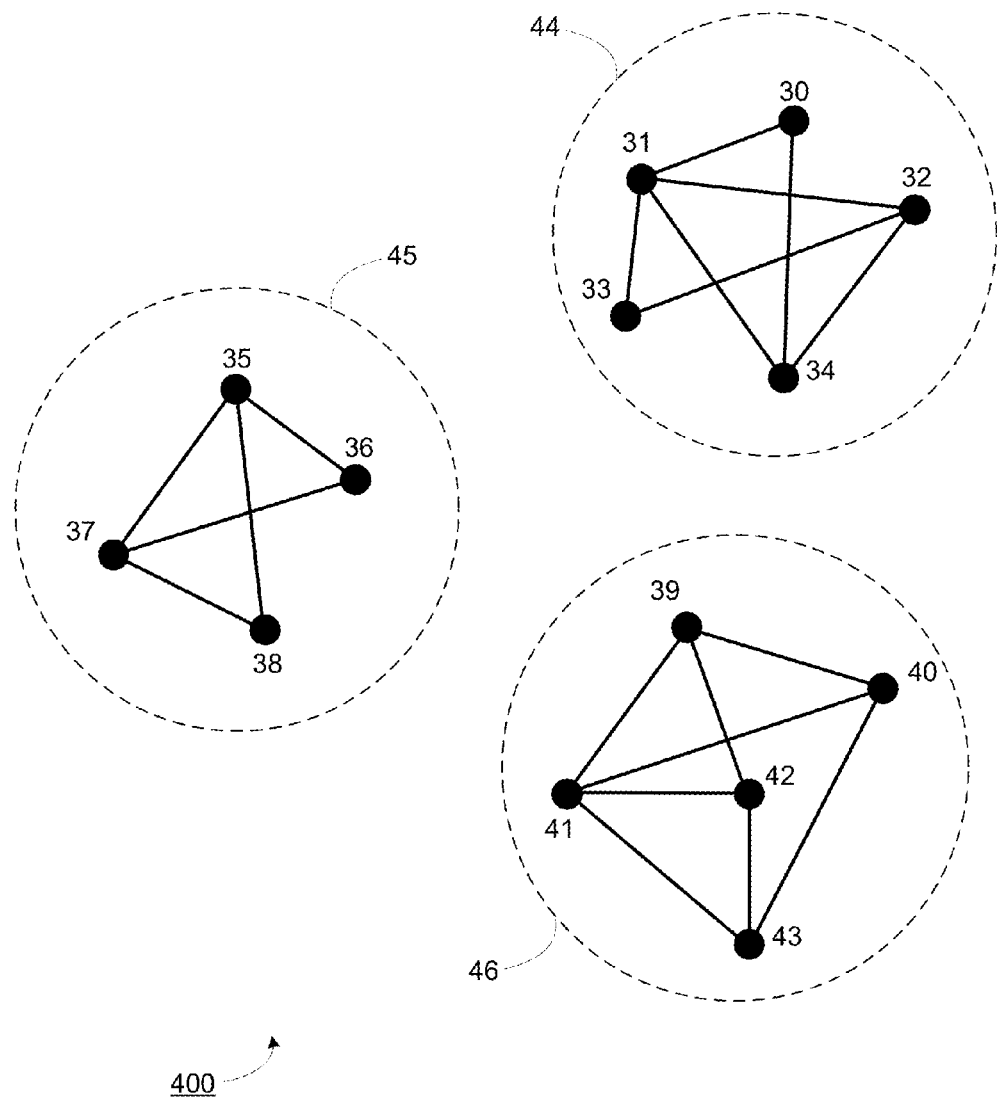

By way of non-limiting example, FIG. 4 illustrates a graph 400 as may be generated during analysis by a community component as described herein. Graph 400 includes the same 14 nodes as graph 300 in FIG. 3, the nodes being labeled from node 30 to node 43. Graph 400 as illustrated includes three communities: community 44 (including nodes 30-31-32-33-34), community 45 (including nodes 35-36-37-38), and community 46 (including nodes 39-40-41-42-43). The nodes within each of these three communities are internally densely connected, while connections of nodes between different communities (see FIG. 3 for comparison) are sparse, and removed from the depiction of graph 400.

Speaker component 27 may be configured to associate nodes in one or more groups, sets, and/or communities to indicate that an individual community is related to an individual speaker. For example, the nodes in an individual group, set, and/or community may represent one or more audio segments. Speaker component 27 may be configured to associate these one or more audio segments as including representations of sounds generated by the same speaker, e.g. a common speaker. In other words, the nodes in a particular group, set, and/or community (may be deemed to) represent audio segments of the same speaker. In some embodiments according to the present disclosure, nodes outside of the particular group, set, and/or community may represent audio segments of one or more different speakers. In some embodiments, no nodes outside of the particular group, set, and/or community represent an audio segment of the same speaker as the nodes in the particular group, set, and/or community.

Referring to graph 400 in FIG. 4, community 44 may be associated, by a speaker component 27 as described herein, with a first speaker, community 45 may be associated with a second speaker, and community 46 may be associated with a third speaker.

Referring to FIG. 1, server(s) 12 and client computing platform(s) 14 may include electronic storage 50 (interchangeably referred to herein as "physical storage media"). Electronic storage 50 may comprise electronic storage media that electronically stores information. The functionality of electronic storage 50 may be similar between different instantiations, even if the stored information may be different. The electronic storage media of electronic storage 50 may include one or both of system storage that is provided integrally (i.e., substantially non-removable) and/or removable storage that is removably connectable to server(s) 12 and/or client computing platform(s) 14 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc., electrical charge-based storage media (e.g., EEPROM, RAM, etc.), solid-state storage media (e.g., flash drive, etc.), and/or other electronically readable storage media. Electronic storage 50 may include one or more virtual storage resources (e.g., cloud storage, a virtual private network, and/or other virtual storage resources). Electronic storage 50 may store software algorithms, information determined by processor(s) 110, information received from components of system 100, and/or other information that enables server(s) 12 and/or client computing platform(s) 14 to function as described herein.

Server(s) 12 and client computing platform(s) 14 may include processor(s) 110. Processor(s) 110 may be configured to provide information processing capabilities in server(s) 12 and/or client computing platform(s) 14. The functionality of processor(s) 110 may be similar between different instantiations, even if the processing capabilities may be different. Processor(s) 110 may include one or more of a digital processor, an analog processor, a digital circuit designed to process information, an analog circuit designed to process information, and/or other mechanisms for electronically processing information. Although processor(s) 110 is shown in FIG. 1 as a single entity, this is for illustrative purposes only. In some embodiments, processor(s) 110 may include a plurality of processing units. These processing units may be physically located within the same device, or processor(s) 110 may represent processing functionality of a plurality of devices operating in coordination. The processor(s) 110 may be configured to execute components 22-27, and/or other components. Processor 110 may be configured to execute components 22-27, and/or other components by software; hardware; firmware; some combination of software, hardware, and/or firmware; and/or other mechanisms for configuring processing capabilities on processor(s) 110.

It should be appreciated that although components 22-27 are illustrated in FIG. 1 as being co-located within the same processing unit, one or more of components 22-27 may be located remotely from the other components. The description of the functionality provided by the different components 22-27 described below is for illustrative purposes, and is not intended to be limiting, as any of components 22-27 may provide more or less functionality than is described. For example, one or more of components 22-27 may be eliminated, and some or all of its functionality may be provided by other ones of components 22-27. As another example, processor 110 may be configured to execute one or more additional components that may perform some or all of the functionality attributed herein to one of components 22-27.

It is noted that the division of functionality between server(s) 12 and client computing platform(s) 14 is not intended to be limited by this disclosure. Functions described in relation with server(s) 12 may be performed and/or shared by one or more other components of system 100, including client computing platform(s) 14, and vice versa.

Figure 2:
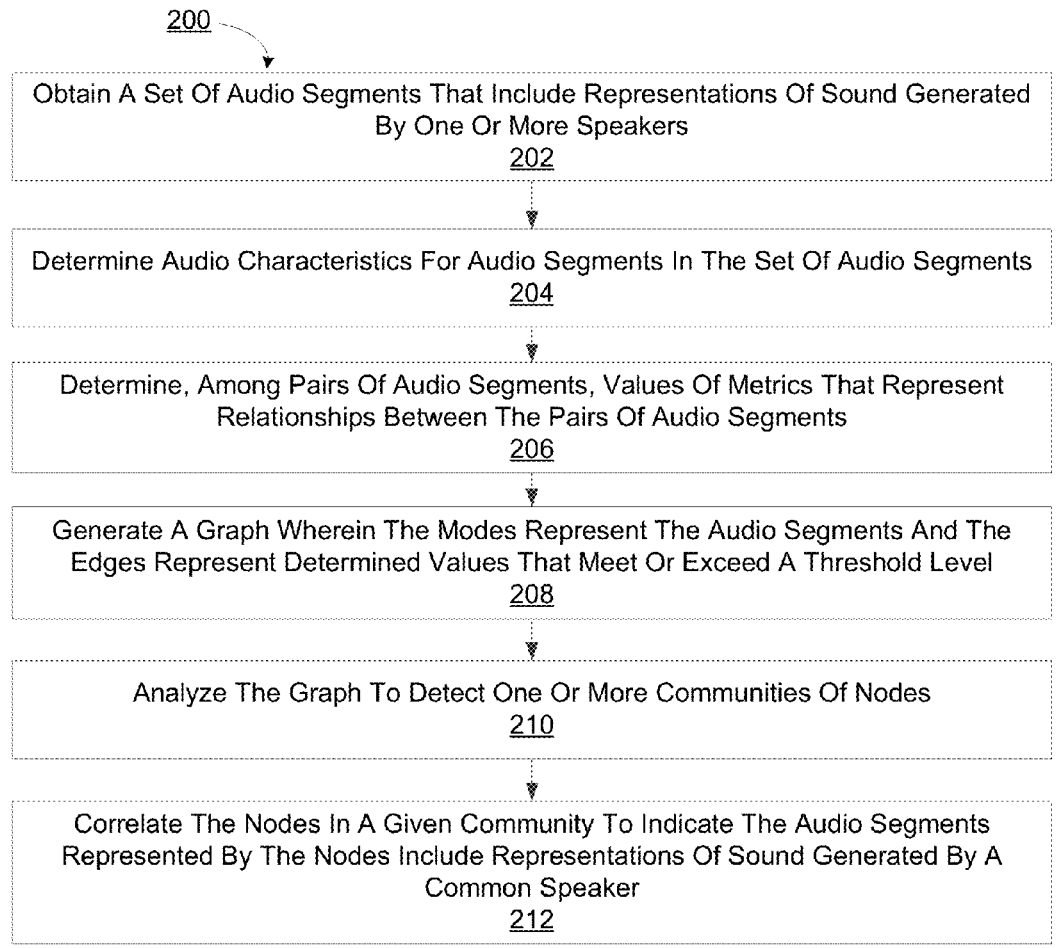
FIG. 2 illustrates a method to perform speaker clustering in accordance with one or more embodiments.

FIG. 2 illustrates an exemplary method 200 for performing speaker clustering, in accordance with one or more embodiments according to the present disclosure. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a controller, a digital circuit designed to process information, an analog circuit designed to process information, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a set of audio segments may be obtained. Individual audio segments may include representations of sound generated by one or more speakers. The set may include a first audio segment and a second audio segment. In some embodiments, operation 202 may be performed by an input component the same as or similar to input component 22 (shown in FIG. 1 and described herein).

At an operation 204, audio characteristics may be determined for audio segments in the set of audio segments. In some embodiments, operation 204 may performed by a parameter component the same as or similar to parameter component 23 (shown in FIG. 1 and described herein).

At an operation 206, scores may be determined, among subsets (such as pairs) of individual audio segments, using one or more metrics that represent relationships between the subsets of audio segments such that a first score represents a relationship between a first audio segment and a second audio segment. The one or more scores may be determined using the audio characteristics of such segments. In some embodiments, operation 206 may be performed by a relationship component the same as or similar to relationship component 24 (shown in FIG. 1 and described herein).

At an operation 208, a graph may be generated wherein a set of nodes represents the set of audio segments and wherein edges between nodes represent relationships between the subsets of audio segments for which the scores represent the relationships have at least a threshold value. In some embodiments, operation 208 may be performed by a representation component the same as or similar to representation component 25 (shown in FIG. 1 and described herein).

At an operation 210, the graph may be analyzed to detect one or more communities of nodes in the graph. In some embodiments, operation 210 may be performed by a community component the same as or similar to community component 26 (shown in FIG. 1 and described herein).

At an operation 212, the nodes in a given community may be associated with a speaker to indicate that the audio segments represented by the nodes in the given community likely include representations of sounds generated by the speaker. In some embodiments, operation 212 may be performed by a speaker component the same as or similar to speaker component 27 (shown in FIG. 1 and described herein).

The present invention, in accordance with one or more various embodiments, is described above in detail with reference to the accompanying figures. The drawings are provided for purposes of illustration only and merely depict exemplary embodiments. These drawings are provided to facilitate the reader's understanding of the systems and methods described herein and shall not be considered limiting of the breadth, scope, or applicability of any of the claims.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for separating speech of individual speakers in audio segments representing speech of a plurality of speakers, the system comprising:
one or more physical processors configured to execute computer program components, wherein the computer program components are configured to:
obtain a plurality of audio segments, wherein each audio segment of the plurality of audio segments includes a representation of speech generated by a speaker of the plurality of speakers;
compute a speaker model for each audio segment of the plurality of audio segments;
compute a plurality of scores, wherein each score of the plurality of scores corresponds to a pair of speaker models, the plurality of scores comprising a first score and a second score, wherein:
the first score is computed using a first speaker model corresponding to a first audio segment and a second speaker model corresponding to a second audio segment, and
the second score is computed using a third speaker model corresponding to a third audio segment and a fourth speaker model corresponding to a fourth audio segment;
generate a graph, wherein each audio segment of the plurality of audio segments corresponds to a node in the graph;
determine to include an edge between a first node of the graph and a second node of the graph using the first score, wherein the first node corresponds to the first audio segment and the second node corresponds to the second audio segment;
determine to not include an edge between a third node of the graph and a fourth node of the graph using the second score, wherein the third node corresponds to the third audio segment and the fourth node corresponds to the fourth audio segment;
determine that the first node corresponds to a first community of nodes using edges connected to the first node, wherein the first community of nodes corresponds to a first speaker of the plurality of speakers; and
determine that the second node corresponds to a second community of nodes using edges connected to the second node, wherein the second community of nodes corresponds to a second speaker of the plurality of speakers.

2. The system of claim 1, wherein the first speaker model comprises an i-vector or a supervector.

3. The system of claim 1, wherein the first score is score is computed using a cosine similarity metric.

4. The system of claim 1, wherein the computer program components are further configured to determine to include the edge between the first node of the graph and the second node of the graph by comparing the first score to a threshold.

5. The system of claim 4, wherein the threshold is determined by computing parameters of a mixture model corresponding to the plurality of scores.

6. The system of claim 1, wherein the computer program components are further configured to determine that the first node corresponds to the first community of nodes through a plurality of iterations, wherein it is determined at each iteration whether to reassign a node to a different community.

7. The system of claim 1, wherein the computer program components are further configured to determine that the first node corresponds to the first community of nodes by computing a metric using the number of edges within the first community of nodes and the number of edges crossing a boundary of the first community of nodes.

8. A computer-implemented method for separating speech of individual speakers in audio segments representing speech of a plurality of speakers, the method comprising:
obtaining a plurality of audio segments, wherein each audio segment of the plurality of audio segments includes a representation of speech generated by a speaker of the plurality of speakers;
computing a speaker model for each audio segment of the plurality of audio segments;
computing a plurality of scores, wherein each score of the plurality of scores corresponds to a pair of speaker models, the plurality of scores comprising a first score and a second score, wherein:
the first score is computed using a first speaker model corresponding to a first audio segment and a second speaker model corresponding to a second audio segment, and
the second score is computed using a third speaker model corresponding to a third audio segment and a fourth speaker model corresponding to a fourth audio segment;
generating a graph, wherein each audio segment of the plurality of audio segments corresponds to a node in the graph;
determining to include an edge between a first node of the graph and a second node of the graph using the first score, wherein the first node corresponds to the first audio segment and the second node corresponds to the second audio segment;
determining to not include an edge between a third node of the graph and a fourth node of the graph using the second score, wherein the third node corresponds to the third audio segment and the fourth node corresponds to the fourth audio segment;
determining that the first node corresponds to a first community of nodes using edges connected to the first node, wherein the first community of nodes corresponds to a first speaker of the plurality of speakers; and
determining that the second node corresponds to a second community of nodes using edges connected to the second node, wherein the second community of nodes corresponds to a second speaker of the plurality of speakers.

9. The method of claim 8, wherein the first speaker model comprises an i-vector or a supervector.

10. The method of claim 8, wherein the first score is score is computed using a cosine similarity metric.

11. The method of claim 8, further comprising determining to include the edge between the first node of the graph and the second node of the graph by comparing the first score to a threshold.

12. The method of claim 11, wherein the threshold is determined using a two-component Gaussian mixture model.

13. The method of claim 8, wherein the plurality of scores are used to determine locations of edges in the graph but are not otherwise used in determining that the first node corresponds to the first community of nodes.

14. The method of claim 8, further comprising determining that the first node corresponds to the first community of nodes by using a graph modularity metric.

15. One or more non-transitory computer-readable media comprising computer executable instructions that, when executed, perform a method for clustering audio segments, the method comprising:
- obtaining a plurality of audio segments, wherein each audio segment of the plurality of audio segments includes a representation of speech generated by a speaker of a plurality of speakers;
- computing a speaker model for each audio segment of the plurality of audio segments;
- computing a plurality of scores, wherein each score of the plurality of scores corresponds to a pair of speaker models, the plurality of scores comprising a first score and a second score, wherein:
- the first score is computed using a first speaker model corresponding to a first audio segment and a second speaker model corresponding to a second audio segment, and
- the second score is computed using a third speaker model corresponding to a third audio segment and a fourth speaker model corresponding to a fourth audio segment;
- generating a graph, wherein each audio segment of the plurality of audio segments corresponds to a node in the graph;
- determining to include an edge between a first node of the graph and a second node of the graph using the first score, wherein the first node corresponds to the first audio segment and the second node corresponds to the second audio segment;
- determining to not include an edge between a third node of the graph and a fourth node of the graph using the second score, wherein the third node corresponds to the third audio segment and the fourth node corresponds to the fourth audio segment;
- determining that the first node corresponds to a first community of nodes using edges connected to the first node, wherein the first community of nodes corresponds to a first speaker of the plurality of speakers; and
- determining that the second node corresponds to a second community of nodes using edges connected to the second node, wherein the second community of nodes corresponds to a second speaker of the plurality of speakers.

16. The one or more non-transitory computer-readable media of claim 15, wherein the first speaker model comprises an i-vector or a supervector.

17. The one or more non-transitory computer-readable media of claim 15, wherein the first score is score is computed using a cosine similarity metric.

18. The one or more non-transitory computer-readable media of claim 15, wherein the computer executable instructions are further configured to determine to include the edge between the first node of the graph and the second node of the graph by comparing the first score to a threshold, and wherein the threshold is determined using a probability of a false match error or a false non-match error.

19. The one or more non-transitory computer-readable media of claim 15, wherein each node corresponds to exactly one community.

20. The one or more non-transitory computer-readable media of claim 15, wherein the graph is initialized with each node corresponding to a different community.

* * * * *

UNITED STATES PATENT AND TRADEMARK OFFICE
CERTIFICATE OF CORRECTION

| | |
|---|---|
| PATENT NO. | : 9,691,391 B2 |
| APPLICATION NO. | : 14/718823 |
| DATED | : June 27, 2017 |
| INVENTOR(S) | : Rodney Gateau |

It is certified that error appears in the above-identified patent and that said Letters Patent is hereby corrected as shown below:

Column 15, Lines 51-52, in Claim 3, delete "score is score is" and insert --score is-- therefor.

Column 16, Lines 52-53, in Claim 10, delete "score is score is" and insert --score is-- therefor.

Column 18, Line 17, in Claim 17, delete "score is score is" and insert --score is-- therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*